(12) United States Patent
Prakash et al.

(10) Patent No.: US 11,854,738 B2
(45) Date of Patent: Dec. 26, 2023

(54) SLEW CONTROL FOR VARIABLE LOAD PULSE-WIDTH MODULATION DRIVER AND LOAD SENSING

(71) Applicant: Cirrus Logic International Semiconductor Ltd., Edinburgh (GB)

(72) Inventors: Chandra B. Prakash, Austin, TX (US); Ramin Zanbaghi, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 257 days.

(21) Appl. No.: 17/540,648

(22) Filed: Dec. 2, 2021

(65) Prior Publication Data

US 2023/0178279 A1    Jun. 8, 2023

(51) Int. Cl.
| | | |
|---|---|---|
| H01H 47/00 | (2006.01) | |
| H01F 7/06 | (2006.01) | |
| H02K 33/00 | (2006.01) | |
| H04R 9/06 | (2006.01) | |

(52) U.S. Cl.
CPC ............. *H01F 7/064* (2013.01); *H02K 33/00* (2013.01); *H04R 9/06* (2013.01); *H04R 2400/03* (2013.01)

(58) Field of Classification Search
None
See application file for complete search history.

(56) References Cited

U.S. PATENT DOCUMENTS

| | | |
|---|---|---|
| 4,268,822 A | 5/1981 | Olsen |
| 4,888,554 A | 12/1989 | Hyde et al. |
| 5,286,941 A | 2/1994 | Bel |
| 5,361,184 A | 11/1994 | El-Sharkawi et al. |
| 5,567,920 A | 10/1996 | Watanabe et al. |
| 5,661,269 A | 8/1997 | Fukuzaki et al. |
| 5,715,529 A | 2/1998 | Kianush et al. |
| 5,898,136 A | 4/1999 | Katsurahira |

(Continued)

FOREIGN PATENT DOCUMENTS

| | | |
|---|---|---|
| CN | 10542884 A | 3/2016 |
| CN | 106471708 A | 3/2017 |

(Continued)

OTHER PUBLICATIONS

International Search Report and Written Opinion of the International Searching Authority, International Application No. PCT/US2019/045554, dated Oct. 17, 2019.

(Continued)

*Primary Examiner* — Stephen W Jackson
(74) *Attorney, Agent, or Firm* — Jackson Walker L.L.P (57) ABSTRACT

A system may include an electromagnetic load, a driver configured to drive the electromagnetic load with a driving signal, and a processing system communicatively coupled to the electromagnetic load and configured to, during a haptic mode of the system couple a first terminal of the electromagnetic load to a ground voltage and cause the driving signal to have a first slew rate, and during a load sensing mode of the system for sensing a current associated with the electromagnetic load, couple the first terminal to a current-sensing circuit having a sense resistor coupled between the first terminal and an electrical node driven to a common-mode voltage and cause the driving signal to have a second slew rate lower than the first slew rate.

18 Claims, 3 Drawing Sheets

(56) References Cited

U.S. PATENT DOCUMENTS

| | | |
|---|---|---|
| 6,231,520 B1 | 5/2001 | Maezawa |
| 6,283,859 B1 | 9/2001 | Carlson et al. |
| 6,380,923 B1 | 4/2002 | Fukumoto et al. |
| 6,473,708 B1 | 10/2002 | Watkins et al. |
| 7,173,410 B1 | 2/2007 | Pond |
| 7,965,276 B1 | 6/2011 | Martin et al. |
| 8,144,126 B2 | 3/2012 | Wright |
| 8,174,352 B2 | 5/2012 | Parpia et al. |
| 8,346,487 B2 | 1/2013 | Wright et al. |
| 8,384,378 B2 | 2/2013 | Feldkamp et al. |
| 8,421,446 B2 | 4/2013 | Straubinger et al. |
| 8,428,889 B2 | 4/2013 | Wright |
| 8,457,915 B2 | 6/2013 | White et al. |
| 8,674,950 B2 | 3/2014 | Olson |
| 8,970,230 B2 | 3/2015 | Narayanasamy et al. |
| 9,070,856 B1 | 6/2015 | Rose et al. |
| 9,164,605 B1 | 10/2015 | Pirogov et al. |
| 9,707,502 B1 | 7/2017 | Bonifas et al. |
| 10,168,855 B2 | 1/2019 | Baughman et al. |
| 10,372,328 B2 | 8/2019 | Zhai |
| 10,571,307 B2 | 2/2020 | Acker |
| 10,599,247 B2 | 3/2020 | Winokur et al. |
| 10,624,691 B2 | 4/2020 | Wiender et al. |
| 10,642,435 B2 | 5/2020 | Maru et al. |
| 10,725,549 B2 | 7/2020 | Marijanovic et al. |
| 10,726,715 B2 | 7/2020 | Hwang et al. |
| 10,795,518 B2 | 10/2020 | Kuan et al. |
| 10,860,202 B2 | 12/2020 | Sepehr et al. |
| 10,866,677 B2 | 12/2020 | Haraikawa |
| 10,908,200 B2 | 2/2021 | You et al. |
| 10,921,159 B1 | 2/2021 | Das et al. |
| 10,935,620 B2 | 3/2021 | Das et al. |
| 10,942,610 B2 | 3/2021 | Maru et al. |
| 10,948,313 B2 | 3/2021 | Kost et al. |
| 11,079,874 B2 | 8/2021 | Lapointe et al. |
| 11,092,657 B2 | 8/2021 | Maru et al. |
| 11,204,670 B2 | 12/2021 | Maru et al. |
| 11,294,503 B2 | 4/2022 | Westerman |
| 11,507,199 B2 | 11/2022 | Melanson |
| 11,537,242 B2 | 12/2022 | Das et al. |
| 11,579,030 B2 | 2/2023 | Li et al. |
| 2001/0045941 A1 | 11/2001 | Rosenberg et al. |
| 2003/0038624 A1 | 2/2003 | Hilliard et al. |
| 2005/0192727 A1 | 9/2005 | Shostak et al. |
| 2005/0258826 A1 | 11/2005 | Kano et al. |
| 2005/0283330 A1 | 12/2005 | Laraia et al. |
| 2006/0025897 A1 | 2/2006 | Shostak et al. |
| 2006/0293864 A1 | 12/2006 | Soss |
| 2007/0047634 A1 | 3/2007 | Kang et al. |
| 2007/0080680 A1 | 4/2007 | Schroeder et al. |
| 2007/0198926 A1 | 8/2007 | Joguet et al. |
| 2007/0268265 A1 | 11/2007 | XiaoPing |
| 2007/0296593 A1 | 12/2007 | Hall et al. |
| 2007/0296709 A1 | 12/2007 | GuangHai |
| 2008/0007534 A1 | 1/2008 | Peng et al. |
| 2008/0024456 A1 | 1/2008 | Peng et al. |
| 2008/0088594 A1 | 4/2008 | Liu et al. |
| 2008/0088595 A1 | 4/2008 | Liu et al. |
| 2008/0099629 A1* | 5/2008 | Abel ............... B64C 13/503 244/223 |
| 2008/0142352 A1 | 6/2008 | Wright |
| 2008/0143681 A1 | 6/2008 | XiaoPing |
| 2008/0150905 A1 | 6/2008 | Grivna et al. |
| 2008/0158185 A1 | 7/2008 | Westerman |
| 2009/0008161 A1 | 1/2009 | Jones et al. |
| 2009/0058430 A1 | 3/2009 | Zhu |
| 2009/0140728 A1 | 6/2009 | Rollins et al. |
| 2009/0251216 A1 | 10/2009 | Giotta et al. |
| 2009/0278685 A1 | 11/2009 | Potyrailo et al. |
| 2009/0302868 A1 | 12/2009 | Feucht et al. |
| 2009/0308155 A1 | 12/2009 | Zhang |
| 2010/0019777 A1 | 1/2010 | Balslink |
| 2010/0045360 A1 | 2/2010 | Howard et al. |
| 2010/0114505 A1 | 5/2010 | Wang et al. |
| 2010/0153845 A1 | 6/2010 | Gregorio et al. |
| 2010/0211902 A1 | 8/2010 | Unsworth et al. |
| 2010/0231239 A1 | 9/2010 | Tateishi et al. |
| 2010/0238121 A1 | 9/2010 | Ely |
| 2010/0328249 A1 | 12/2010 | Ningrat et al. |
| 2011/0005090 A1 | 1/2011 | Lee et al. |
| 2011/0214481 A1 | 9/2011 | Kachanov et al. |
| 2011/0216311 A1 | 9/2011 | Kachanov et al. |
| 2011/0267302 A1 | 11/2011 | Fasshauer |
| 2011/0285667 A1 | 11/2011 | Poupyrev et al. |
| 2011/0291821 A1 | 12/2011 | Chung |
| 2011/0301876 A1 | 12/2011 | Yamashita |
| 2013/0018489 A1 | 1/2013 | Grunthaner et al. |
| 2013/0076374 A1 | 3/2013 | Huang |
| 2013/0106756 A1 | 5/2013 | Kono et al. |
| 2013/0106769 A1 | 5/2013 | Bakken et al. |
| 2013/0269446 A1 | 10/2013 | Fukushima et al. |
| 2014/0002113 A1 | 1/2014 | Schediwy et al. |
| 2014/0028327 A1 | 1/2014 | Potyrailo et al. |
| 2014/0137585 A1 | 5/2014 | Lu et al. |
| 2014/0225599 A1 | 8/2014 | Hess |
| 2014/0253107 A1 | 9/2014 | Roach et al. |
| 2014/0267065 A1 | 9/2014 | Levesque |
| 2014/0278173 A1 | 9/2014 | Elia et al. |
| 2015/0022174 A1 | 1/2015 | Nikitin |
| 2015/0027139 A1 | 1/2015 | Lin et al. |
| 2015/0077094 A1 | 3/2015 | Baldwin et al. |
| 2015/0084874 A1 | 3/2015 | Cheng et al. |
| 2015/0109243 A1 | 4/2015 | Jun et al. |
| 2015/0205357 A1* | 7/2015 | Virtanen ............... G06F 3/041 340/407.2 |
| 2015/0293695 A1 | 10/2015 | Schonleben et al. |
| 2015/0329199 A1 | 11/2015 | Golborne et al. |
| 2015/0355043 A1 | 12/2015 | Steeneken et al. |
| 2016/0018940 A1 | 1/2016 | Lo et al. |
| 2016/0048256 A1 | 2/2016 | Day |
| 2016/0117084 A1 | 4/2016 | Ording |
| 2016/0162031 A1 | 6/2016 | Westerman et al. |
| 2016/0169717 A1 | 6/2016 | Zhitomirsky |
| 2016/0179243 A1 | 6/2016 | Schwartz |
| 2016/0231860 A1 | 8/2016 | Elia |
| 2016/0231874 A1 | 8/2016 | Baughman et al. |
| 2016/0241227 A1 | 8/2016 | Hirata |
| 2016/0252403 A1 | 9/2016 | Murakami |
| 2016/0357296 A1 | 12/2016 | Picciotto et al. |
| 2017/0077735 A1 | 3/2017 | Leabman |
| 2017/0093222 A1 | 3/2017 | Joye et al. |
| 2017/0097437 A1 | 4/2017 | Widmer et al. |
| 2017/0140644 A1 | 5/2017 | Hwang et al. |
| 2017/0147068 A1 | 5/2017 | Yamazaki et al. |
| 2017/0168578 A1 | 6/2017 | Tsukamoto et al. |
| 2017/0169674 A1 | 6/2017 | Macours |
| 2017/0184416 A1 | 6/2017 | Kohlenberg et al. |
| 2017/0185173 A1 | 6/2017 | Ito et al. |
| 2017/0187541 A1 | 6/2017 | Sundaresan et al. |
| 2017/0237293 A1 | 8/2017 | Faraone et al. |
| 2017/0242505 A1 | 8/2017 | Vandermeijden et al. |
| 2017/0282715 A1 | 10/2017 | Fung et al. |
| 2017/0315653 A1 | 11/2017 | Vandermeijden et al. |
| 2017/0322643 A1 | 11/2017 | Eguchi |
| 2017/0328740 A1 | 11/2017 | Widmer et al. |
| 2017/0371380 A1 | 12/2017 | Oberhauser et al. |
| 2017/0371381 A1 | 12/2017 | Liu |
| 2017/0371473 A1 | 12/2017 | David et al. |
| 2018/0019722 A1 | 1/2018 | Birkbeck |
| 2018/0020288 A1 | 1/2018 | Risbo et al. |
| 2018/0039331 A1 | 2/2018 | Warren |
| 2018/0055448 A1 | 3/2018 | Karakaya et al. |
| 2018/0059793 A1 | 3/2018 | Hajati |
| 2018/0067601 A1 | 3/2018 | Winokur et al. |
| 2018/0088064 A1 | 3/2018 | Potyrailo et al. |
| 2018/0088702 A1 | 3/2018 | Schutzberg et al. |
| 2018/0097475 A1 | 4/2018 | Djahanshahi et al. |
| 2018/0135409 A1 | 5/2018 | Wilson et al. |
| 2018/0182212 A1 | 6/2018 | Li et al. |
| 2018/0183372 A1 | 6/2018 | Li et al. |
| 2018/0189647 A1 | 7/2018 | Calvo et al. |
| 2018/0195881 A1 | 7/2018 | Acker |
| 2018/0221796 A1 | 8/2018 | Bonifas et al. |
| 2018/0229161 A1 | 8/2018 | Maki et al. |

(56) References Cited

U.S. PATENT DOCUMENTS

| | | | |
|---|---|---|---|
| 2018/0231485 | A1 | 8/2018 | Potyrailo et al. |
| 2018/0260049 | A1 | 9/2018 | O'Lionaird et al. |
| 2018/0260050 | A1 | 9/2018 | Unseld et al. |
| 2018/0321748 | A1 | 11/2018 | Rao et al. |
| 2018/0364731 | A1 | 12/2018 | Liu et al. |
| 2019/0052045 | A1 | 2/2019 | Metzger et al. |
| 2019/0179146 | A1 | 6/2019 | De Nardi |
| 2019/0197218 | A1 | 6/2019 | Schwartz |
| 2019/0204929 | A1 | 7/2019 | Attari et al. |
| 2019/0235629 | A1 | 8/2019 | Hu et al. |
| 2019/0286263 | A1 | 9/2019 | Bagheri et al. |
| 2019/0302161 | A1 | 10/2019 | You et al. |
| 2019/0302193 | A1 | 10/2019 | Maru et al. |
| 2019/0302890 | A1 | 10/2019 | Marijanovic et al. |
| 2019/0302922 | A1 | 10/2019 | Das et al. |
| 2019/0302923 | A1 | 10/2019 | Maru et al. |
| 2019/0326906 | A1 | 10/2019 | Camacho Cardenas et al. |
| 2019/0339313 | A1 | 11/2019 | Vandermeijden |
| 2019/0377468 | A1 | 12/2019 | Micci et al. |
| 2020/0064952 | A1 | 1/2020 | Siemieniec et al. |
| 2020/0064160 | A1 | 2/2020 | Maru et al. |
| 2020/0133455 | A1 | 4/2020 | Sepehr et al. |
| 2020/0177290 | A1 | 6/2020 | Reimer et al. |
| 2020/0191761 | A1 | 6/2020 | Potyrailo et al. |
| 2020/0271477 | A1 | 8/2020 | Kost et al. |
| 2020/0271706 | A1 | 8/2020 | Wardlaw et al. |
| 2020/0271745 | A1 | 8/2020 | Das et al. |
| 2020/0272301 | A1 | 8/2020 | Duewer et al. |
| 2020/0319237 | A1 | 10/2020 | Maru et al. |
| 2020/0320966 | A1 | 10/2020 | Clark et al. |
| 2020/0373923 | A1 | 11/2020 | Walsh et al. |
| 2020/0382113 | A1 | 12/2020 | Beardsworth et al. |
| 2020/0386804 | A1 | 12/2020 | Das et al. |
| 2021/0064137 | A1 | 3/2021 | Wopat et al. |
| 2021/0074460 | A1* | 3/2021 | Sen .................. G06F 1/1662 |
| 2021/0140797 | A1 | 5/2021 | Kost et al. |
| 2021/0149538 | A1 | 5/2021 | Lapointe et al. |
| 2021/0152174 | A1 | 5/2021 | Yancey et al. |
| 2021/0361940 | A1 | 11/2021 | Yeh et al. |
| 2021/0396610 | A1 | 12/2021 | Li et al. |
| 2021/0404901 | A1 | 12/2021 | Kost et al. |
| 2022/0075500 | A1 | 3/2022 | Chang et al. |
| 2022/0268233 | A1 | 8/2022 | Kennedy |
| 2022/0307867 | A1 | 9/2022 | Das et al. |
| 2022/0308000 | A1 | 9/2022 | Das et al. |
| 2022/0404409 | A1 | 12/2022 | Maru et al. |

FOREIGN PATENT DOCUMENTS

| | | | |
|---|---|---|---|
| CN | 107076623 | A | 8/2017 |
| CN | 209069345 | U | 7/2019 |
| CN | 110609610 | A | 12/2019 |
| DE | 4004450 | A1 | 8/1991 |
| DE | 602004005672 | T2 | 12/2007 |
| DE | 102015215330 | A1 | 2/2017 |
| DE | 102015215331 | A1 | 2/2017 |
| EP | 1697710 | B1 | 4/2007 |
| EP | 2682843 | A1 | 1/2014 |
| GB | 2394295 | A | 4/2004 |
| GB | 2573644 | A | 11/2019 |
| GB | 2582065 | A | 9/2020 |
| GB | 2582864 | A | 10/2020 |
| GB | 2586722 | B | 2/2022 |
| JP | 2006246289 | A | 9/2006 |
| KR | 20130052059 | A | 5/2013 |
| WO | 00/33244 | A2 | 6/2000 |
| WO | 20061354832 | A2 | 12/2006 |
| WO | 2007068283 | A1 | 6/2007 |
| WO | 2016032704 | A1 | 3/2016 |
| WO | 2021101722 | A1 | 5/2021 |
| WO | 2021101723 | A1 | 5/2021 |

OTHER PUBLICATIONS

Combined Search and Examination Report, UKIPO, Application No. GB1904250.6, dated Sep. 10, 2019.
International Search Report and Written Opinion of the International Searching Authority, International Application No. PCT/US2019/022518, dated May 24, 2019.
International Search Report and Written Opinion of the International Searching Authority, International Application No. PCT/US2019/022578, dated May 27, 2019.
International Search Report and Written Opinion of the International Searching Authority, International Application No. PCT/US2019/021838, dated May 27, 2019.
Combined Search and Examination Report under Sections 17 and 18(3), UKIPO, Application No. GB2001341.3, dated Jun. 29, 2020.
International Search Report and Written Opinion of the International Searching Authority, International Application No. PCT/US2020/059113, dated Feb. 23, 2021.
International Search Report and Written Opinion of the International Searching Authority, International Application No. PCT/US2020/059101, dated Mar. 9, 2021.
First Office Action, China National Intellectual Property Administration, Application No. 201980022689.9, dated Jun. 2, 2021.
First Office Action, China National Intellectual Property Administration, Application No. 201980022693.5, dated Jul. 8, 2021.
International Search Report and Written Opinion of the International Searching Authority, International Application No. PCT/US2021/035695, dated Sep. 9, 2021.
International Search Report and Written Opinion of the International Searching Authority, International Application No. PCT/US2022/012721, dated Apr. 26, 2022.
Second Office Action, China National Intellectual Property Administration, Application No. 201980022693.5, dated Apr. 13, 2022.
Examination Report under Section 18(3), UKIPO, Application No. GB2015439.9, dated May 10, 2022.
Second Office Action, China National Intellectual Property Administration, Application No. 201980022689.9, dated Oct. 27, 2021.
Second Office Action, China National Intellectual Property Administration, Application No. 201980022693.5, dated Dec. 14, 2021.
Combined Search and Examination Report under Sections 17 and 18(3), UKIPO, Application No. GB2111666.0, dated Feb. 11, 2022.
Examination Report under Section 18(3), UKIPO, Application No. GB2101804.9, dated Feb. 25, 2022.
First Office Action, China National Intellectual Property Administration, Application No. 202080080853.4, dated Feb. 22, 2023.
Combined Search and Examination Report under Sections 17 and 18(3), United Kingdom Intellectual Property Office, Application No. GB2215005.6, dated Apr. 11, 2023.
Gao, Shuo, et al., Piezoelectric vs. Capactivie Based Force Sensing in Capacitive Touch Panels, IEEE Access, vol. 4, Jul. 14, 2016.
Second Office Action, China National Intellectual Property Administration, Application No. 201980054799.3, dated May 24, 2023.
International Search Report and Written Opinion of the International Searching Authority, International Application No. PCT/US2022/018886, dated Jun. 10, 2022.
Combined Search and Examination Report under Sections 17 and 18(3), UKIPO, Application No. GB2201194.4, dated Jul. 1, 2022.
International Search Report and Written Opinion of the International Searching Authority, International Application No. PCT/US2022/018475, dated Aug. 2, 2022.
First Office Action, China National Intellectual Property Administration, Application No. 202010105829.3, dated Apr. 12, 2022, received by counsel Jul. 28, 2022.
Notice of Preliminary Rejection, Korean Intellectual Property Office, Application No. 10-2020-7029597, dated Jul. 29, 2022.
First Office Action, China Intellectual Property Administration, Application No. 202180043659.3, dated Sep. 8, 2023.
Combined Search and Examination Report, United Kingdom Intellectual Property Office, Application No. GB2313599.9, dated Oct. 9, 2023.

* cited by examiner

SLEW CONTROL FOR VARIABLE LOAD PULSE-WIDTH MODULATION DRIVER AND LOAD SENSING

FIELD OF DISCLOSURE

The present disclosure relates in general to methods, apparatuses, or implementations for haptic devices. Embodiments set forth herein may disclose improvements relating to how a physical quantity, such as inductance or displacement, of a haptic actuator or other electromechanical load may be sensed.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

Figure 1:
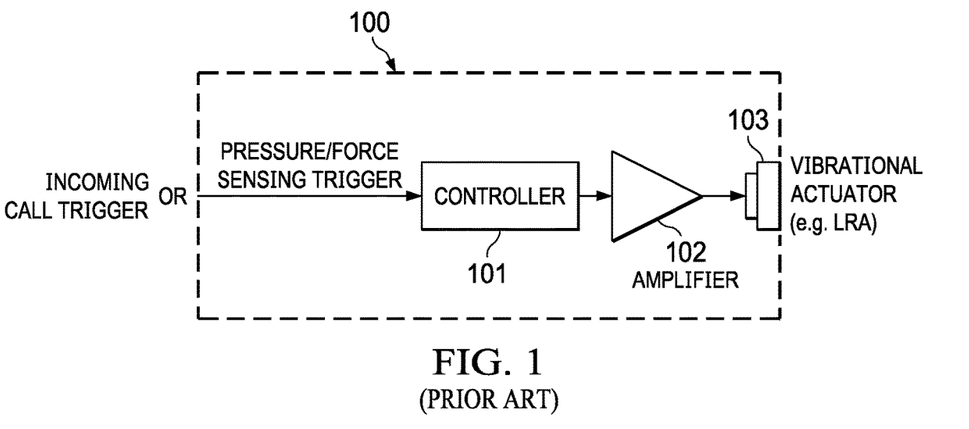
FIG. 1 illustrates an example of a vibro-haptic system in a device, as is known in the art.

FIG. 1 illustrates an example of a vibro-haptic system in a device 100. Device 100 may comprise a controller 101 configured to control a signal applied to an amplifier 102. Amplifier 102 may then drive a vibrational actuator (e.g., haptic transducer) 103 based on the signal. Controller 101 may be triggered by a trigger to output to the signal. The trigger may, for example, comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}} \qquad (1)$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

Figure 2:
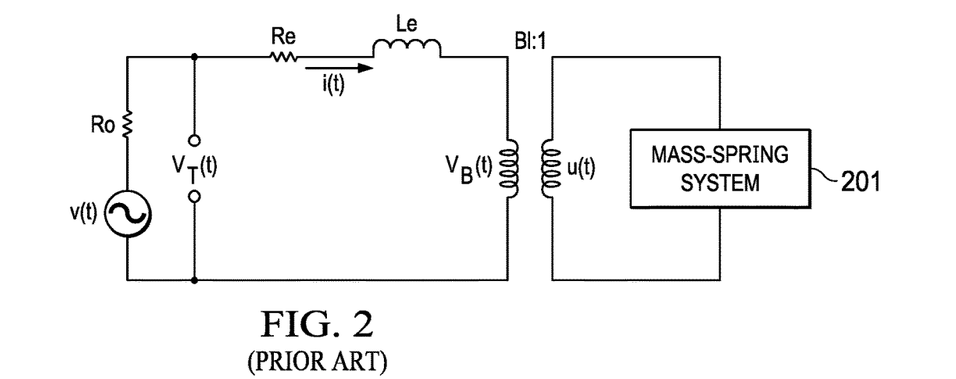
FIG. 2 illustrates an example of a Linear Resonant Actuator (LRA) modelled as a linear system, as is known in the art.

FIG. 2 illustrates an example of a linear resonant actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V (t) with the output impedance Ro. The terminal voltage $V_T(t)$ may be sensed across the terminals of the haptic transducer. The mass-spring system 201 moves with velocity u(t).

A haptic system may require precise control of movements of the haptic transducer. Such control may rely on the magnetic force factor Bl, which may also be known as the electromagnetic transfer function of the haptic transducer. In an ideal case, magnetic force factor Bl can be given by the product B·l, where B is magnetic flux density and l is a total length of electrical conductor within a magnetic field. Both magnetic flux density B and length l should remain constant in an ideal case with motion occurring along a single axis.

In generating haptic vibration, an LRA may undergo displacement. In order to protect an LRA from damage, such displacement may be limited. Accordingly, accurate measurement of displacement may be crucial in optimizing LRA displacement protection algorithms Accurate measurement of displacement may also enable increased drive levels of the LRA. While existing approaches measure displacement, such approaches have disadvantages. For example, displacement may be measured using a Hall sensor, but Hall sensors are often costly to implement.

SUMMARY

In accordance with the teachings of the present disclosure, the disadvantages and problems associated with existing approaches for sensing displacement of an electromagnetic transducer may be reduced or eliminated.

In accordance with embodiments of the present disclosure, a system may include an electromagnetic load, a driver configured to drive the electromagnetic load with a driving signal, and a processing system communicatively coupled to the electromagnetic load and configured to, during a haptic mode of the system, couple a first terminal of the electromagnetic load to a ground voltage and cause the driving signal to have a first slew rate, and during a load sensing mode of the system for sensing a current associated with the electromagnetic load, couple the first terminal to a current-sensing circuit having a sense resistor coupled between the first terminal and an electrical node driven to a common-mode voltage and cause the driving signal to have a second slew rate lower than the first slew rate.

In accordance with these and other embodiments of the present disclosure, a method may include, during a haptic mode of a system comprising an electromagnetic load and a driver configured to drive the electromagnetic load with a driving signal, coupling a first terminal of the electromagnetic load to a ground voltage and causing the driving signal to have a first slew rate, and during a load sensing mode of the system for sensing a current associated with the electromagnetic load, coupling the first terminal to a current-sensing circuit having a sense resistor coupled between the first terminal and an electrical node driven to a common-mode voltage and causing the driving signal to have a second slew rate lower than the first slew rate.

In accordance with these and other embodiments of the present disclosure, a processing system may include an output for causing a driver to drive an electromagnetic load with a driving signal, an input for sensing a current associated with the electromagnetic load, and logic configured to, during a haptic mode of a system comprising an electromagnetic load and a driver configured to drive the electromagnetic load with a driving signal, couple a first terminal of the electromagnetic load to a ground voltage and cause the driving signal to have a first slew rate, and during a load sensing mode of the system for sensing the current associated with the electromagnetic load, couple the first terminal to a current-sensing circuit having a sense resistor coupled between the first terminal and an electrical node driven to a common-mode voltage and cause the driving signal to have a second slew rate lower than the first slew rate.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection-type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal may generally be an analog time varying voltage signal, for example, a time varying waveform.

To accurately sense displacement of an electromagnetic load, methods and systems of the present disclosure may determine an inductance of the electromagnetic load, and then convert the inductance to a position signal, as described in greater detail below. Further, to measure inductance of an electromagnetic load, methods and systems of the present disclosure may utilize either a phase measurement approach and/or a high-frequency pilot-tone driven approach, as also described in greater detail below.

To illustrate, an electromagnetic load may be driven by a driving signal V(t) to generate a sensed terminal voltage $V_T(t)$ across a coil of the electromagnetic load. Sensed terminal voltage $V_T(t)$ may be given by:

$$V_T(t) = Z_{COIL}I(t) + V_B(t)$$

wherein I(t) is a sensed current through the electromagnetic load, $Z_{COIL}$, is an impedance of the electromagnetic load, and $V_B(t)$ is the back-electromotive force (back-EMF) associated with the electromagnetic load.

As used herein, to "drive" an electromagnetic load means to generate and communicate a driving signal to the electromagnetic load to cause displacement of a movable mass of the electromagnetic load.

Because back-EMF voltage $V_B(t)$ may be proportional to velocity of the moving mass of the electromagnetic load, back-EMF voltage $V_B(t)$ may in turn provide an estimate of such velocity. Thus, velocity of the moving mass may be recovered from sensed terminal voltage $V_T(t)$ and sensed current I(t) provided that either: (a) sensed current I(t) is equal to zero, in which case $V_B = V_T(t)$; or (b) coil impedance $Z_{COIL}$ is known or is accurately estimated.

Position of the moving mass may be related to a coil inductance $L_{COIL}$ of the electromagnetic load. At high frequencies significantly above the bandwidth of the electromagnetic load, back-EMF voltage $V_B(t)$ may become negligible and inductance may dominate the coil impedance $Z_{COIL}$. Sensed terminal voltage $V_{T@HF}(t)$ at high frequencies may be estimated by:

$$V_{T@HF}(t) = Z_{COIL}I_{@HF}(t)$$

Hence, at high frequencies, the position of the moving mass of the electromagnetic load may be recovered from sensed terminal voltage $V_T(t)$ and sensed current $I(t)$ by: (a) estimating the coil impedance at high frequency as $Z_{COIL@HF} \cong R_{@HF} + L_{@HF} \cdot s$, where $R_{@HF}$ is the resistive part of the coil impedance at high frequency, $L_{@HF}$ is the coil inductance at high frequency, and s is the Laplace transform; and (b) converting the measured inductance to a position signal. Velocity and/or position may be used to control vibration of the moving mass of the electromagnetic load.

Figure 3:
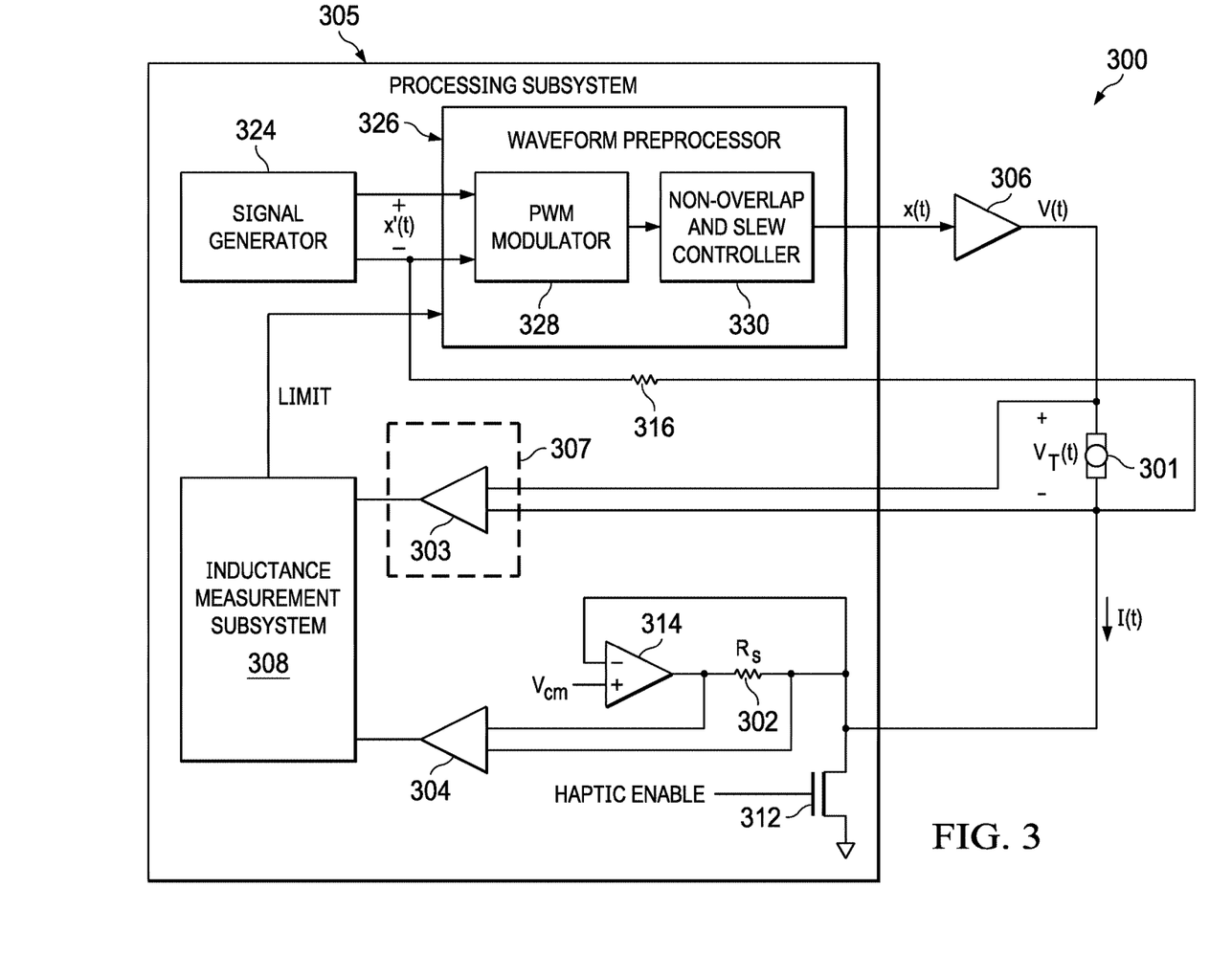
FIG. 3 illustrates selected components of an example host device, in accordance with embodiments of the present disclosure.

FIG. 3 illustrates selected components of an example host device 300 having an electromagnetic load 301, in accordance with embodiments of the present disclosure. Host device 300 may include, without limitation, a mobile device, home application, vehicle, and/or any other system, device, or apparatus that includes a human-machine interface. Electromagnetic load 301 may include any suitable load with a complex impedance, including without limitation a haptic transducer, a loudspeaker, a microspeaker, a piezoelectric transducer, a voice-coil actuator, a solenoid, or other suitable transducer.

In operation, a signal generator 324 of a processing subsystem 305 of host device 300 may generate a raw transducer driving signal x'(t) (which, in some embodiments, may be a waveform signal, such as a haptic waveform signal or audio signal). Raw transducer driving signal x'(t) may be generated based on a desired playback waveform received by signal generator 324. In some embodiments, raw transducer driving signal x'(t) may comprise a differential pulse-width modulated (PWM) signal.

Raw transducer driving signal x'(t) may be received by waveform preprocessor 326 which, as described in greater detail below, may modify or otherwise convert raw transducer driving signal x'(t) in order to generate processed transducer driving signal x(t). For example, waveform processor 326 may include a PWM modulator 328 and non-overlap and slew controller 330. PWM modulator 328 may include any suitable device, system, or apparatus configured to generate a single-ended PWM signal from raw transducer driving signal x' (t). For example, PWM modulator 328 may include a delta-sigma modulator comprising one or more integrator stages, a quantizer, and a conversion block configured to convert a differential signal into a single-ended signal. Accordingly, processed transducer driving signal x(t) may comprise a single-ended signal (e.g., a single-ended PWM signal) communicated to amplifier 306.

Processed transducer driving signal x(t) may in turn be amplified by amplifier 306 to generate a driving signal V (t) for driving electromagnetic load 301. Amplifier 306 may comprise a single-ended Class-D output stage (e.g., one half of an H-bridge). Responsive to driving signal V(t), a sensed terminal voltage $V_T(t)$ of electromagnetic load 301 may be sensed by a terminal voltage sensing block 307 of processing subsystem 305, for example a volt-meter, and converted to a digital representation by a first analog-to-digital converter (ADC) 303. As shown in FIG. 3, a feedback resistor 316 coupled to a terminal of electromagnetic load 301 may provide closed-loop feedback to the generation of processed transducer driving signal x(t).

Similarly, sensed current I(t) may be converted to a digital representation by a second ADC 304. Current I(t) may be sensed across a shunt resistor 302 having resistance $R_s$ coupled to a terminal of electromagnetic load 301. As shown in FIG. 3, ADC 304 and shunt resistor 302 may be part of a current-sensing circuit including a ground-return transistor 312 and a common-mode buffer 314. During a haptics mode, when waveform preprocessor 326 drives a haptic waveform as processed transducer driving signal x(t), ground return transistor 312 may be enabled (e.g., on, closed, activated) and common-mode buffer 314 may be disabled (e.g., off, deactivated), thus coupling a terminal of electromagnetic load 301 to ground. On the other hand, during a load sensing mode, ground return transistor 312 may be disabled and common-mode buffer 314 may be enabled, thus coupling the same terminal of electromagnetic load 301 to a common-mode voltage $V_{CM}$. In the load sensing mode, waveform preprocessor 326 may drive a pilot tone or other signal suitable for measuring driving signal V(t) and sensed current I(t) in order to determine an impedance (e.g., resistance and inductance) of electromagnetic load 301, wherein a component of such impedance (e.g., inductance) may be representative of a displacement of electromagnetic load 301.

As shown in FIG. 3, processing subsystem 305 may include an inductance measurement subsystem 308 that may estimate coil inductance $L_{COIL}$, of electromagnetic load 301. From such estimated coil inductance $L_{COIL}$, inductance measurement subsystem 308 may determine a displacement associated with electromagnetic load 301. If such displacement exceeds a threshold, high-frequency pilot-tone driven inductance measurement subsystem 308 may communicate a limiting signal (indicated by "LIMIT" in FIG. 3) to modify raw transducer driving signal x' (t) in a manner that prevents over-excursion in the displacement of electromagnetic load 301.

In operation, to estimate impedance $Z_{COIL}$, inductance measurement subsystem 308 may measure impedance in any suitable manner, including without limitation using the approaches set forth in U.S. patent application Ser. No. 17/497,110 filed Oct. 8, 2021, which is incorporated in its entirety by reference herein.

One disadvantage of the architecture depicted in FIG. 3 stems from the presence of the current measurement circuit of processing subsystem 305. To illustrate, ground return transistor 312 may use a medium-level voltage to maximize efficiency in the haptics mode while using minimal physical circuit area. Further, during the load sensing mode, common-mode voltage $V_{CM}$ may be required to remain below the time-dependent dielectric breakdown limit of the drain-to-source voltage of ground return transistor 312. In addition, due to the PWM nature of the waveform at the terminal of electromagnetic load 301 coupled to amplifier 306, some voltage ripple may be present on the terminal of electromagnetic load 301 coupled to ground return transistor 312 and at the output of common-mode buffer 314 due to the finite bandwidth of common-mode buffer 314. In some cases, extreme ripple may result due to the variable nature of electromagnetic load 301.

For example, with an example scenario in which common-mode voltage $V_{CM}$ is 4.5 V, an ideal bandwidth of common-mode buffer 314 is 10 MHz, and shunt resistor 302 has resistance $R_S$ of 150Ω, the terminal of electromagnetic load 301 coupled to ground return transistor 312 may swing wildly between 0 V and 9 V, potentially leading to an unreliability of ground return transistor 312 and in input terminal pair of common-mode buffer 314. Further, if the output of common-mode buffer 314 were to become negative, common-mode buffer 314 may not be able to effectively provide voltage regulation.

Figure 4:
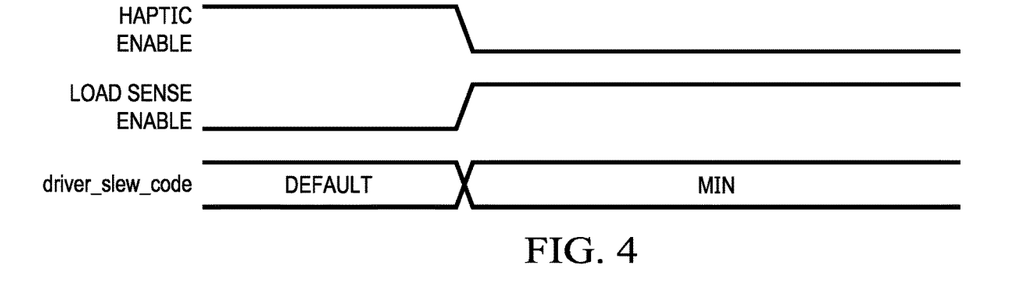
FIG. 4 illustrates waveforms of example control signals for controlling driving signal slew rates between operational modes, in accordance with embodiments of the present disclosure.

To overcome such disadvantages, in operation, non-overlap and slew controller 330 may be configured to drive processed transducer driving signal x(t) at a higher slew rate in the haptics mode than at which it drives processed transducer driving signal x(t) in the load sensing mode, as shown in FIG. 4. For example, as shown in FIG. 4, when the haptics mode is enabled (and thus, the load sensing mode is disabled), a driver slew code used by non-overlap and slew controller 330 may be set to a default value. Such default value may be selected to be a maximum possible slew rate for maximizing efficiency while meeting electromagnetic emission requirements during the haptics mode. However, during the load sensing mode, efficiency may not be a concern, and accordingly, when the haptics mode is disabled (and thus, the load sensing mode is enabled), a driver slew code used by non-overlap and slew controller 330 may be set to a minimum value or some other value significantly lower than the default value.

Figure 5:
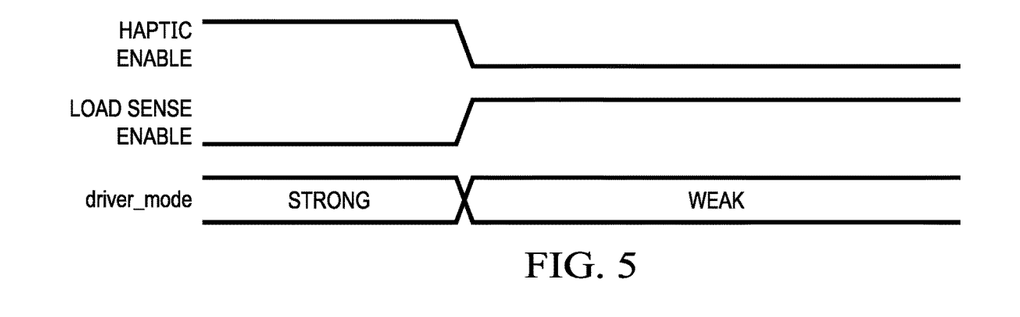
FIG. 5 illustrates waveforms of example control signals for controlling driving signal strength between operational modes, in accordance with embodiments of the present disclosure.

In addition or alternatively, to overcome such disadvantages, the same or a similar result to controlling slew rate may be obtained by changing the drive strength of amplifier 306 between the haptics mode and the load sensing mode. For example, as shown in FIG. 5, when the haptics mode is enabled (and thus, the load sensing mode is disabled), amplifier 306 may be configured to strongly drive driving signal V(t). On the other hand, when the haptics mode is disabled (and thus, the load sensing mode is enabled), amplifier 306 may be configured to weakly drive driving signal V(t) at a drive strength lower than that used during the haptics mode.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
   an electromagnetic load;
   a driver configured to drive the electromagnetic load with a driving signal; and
   a processing system communicatively coupled to the electromagnetic load and configured to:
      during a haptic mode of the system:
         couple a first terminal of the electromagnetic load to a ground voltage; and
         cause the driving signal to have a first slew rate; and
      during a load sensing mode of the system for sensing a current associated with the electromagnetic load:
         couple the first terminal to a current-sensing circuit having a sense resistor coupled between the first terminal and an electrical node driven to a common-mode voltage; and
         cause the driving signal to have a second slew rate lower than the first slew rate.

2. The system of claim 1, wherein the driving signal is a pulse-width modulated signal.

3. The system of claim 1, wherein the processing system comprises a switch coupled between the first terminal and the ground voltage in order to couple the first terminal to the ground voltage.

4. The system of claim 1, wherein the processing system is configured to control slew rates of the driving signal by controlling slew rates of a signal received by an input of the driver.

5. The system of claim 1, wherein the processing system is configured to control slew rates of the driving signal by controlling a drive strength of the driver.

6. The system of claim 1, wherein the processing system further comprises a buffer coupled by its output to the electrical node in order to generate the common-mode voltage at the electrical node.

7. A method, comprising:
   during a haptic mode of a system comprising an electromagnetic load and a driver configured to drive the electromagnetic load with a driving signal:
      coupling a first terminal of the electromagnetic load to a ground voltage; and
      causing the driving signal to have a first slew rate; and
   during a load sensing mode of the system for sensing a current associated with the electromagnetic load:

coupling the first terminal to a current-sensing circuit having a sense resistor coupled between the first terminal and an electrical node driven to a common-mode voltage; and causing the driving signal to have a second slew rate lower than the first slew rate.

8. The method of claim 7, wherein the driving signal is a pulse-width modulated signal.

9. The method of claim 7, further comprising coupling the first terminal to the ground voltage via a switch coupled between the first terminal and the ground voltage.

10. The method of claim 7, further comprising controlling slew rates of the driving signal by controlling slew rates of a signal received by an input of the driver.

11. The method of claim 7, further comprising controlling slew rates of the driving signal by controlling a drive strength of the driver.

12. The method of claim 7, further comprising generating the common-mode voltage at the electrical node with a buffer coupled by its output to the electrical node.

13. A processing system, comprising:
an output for causing a driver to drive an electromagnetic load with a driving signal;
an input for sensing a current associated with the electromagnetic load; and
logic configured to:
during a haptic mode of a system comprising an electromagnetic load and a driver configured to drive the electromagnetic load with a driving signal:
couple a first terminal of the electromagnetic load to a ground voltage; and
cause the driving signal to have a first slew rate; and
during a load sensing mode of the system for sensing the current associated with the electromagnetic load:
couple the first terminal to a current-sensing circuit having a sense resistor coupled between the first terminal and an electrical node driven to a common-mode voltage; and
cause the driving signal to have a second slew rate lower than the first slew rate.

14. The processing system of claim 13, wherein the driving signal is a pulse-width modulated signal.

15. The processing system of claim 13, the logic further configured to couple the first terminal to the ground voltage via a switch coupled between the first terminal and the ground voltage.

16. The processing system of claim 13, the logic further configured to control slew rates of the driving signal by controlling slew rates of a signal received by an input of the driver.

17. The processing system of claim 13, the logic further configured to control slew rates of the driving signal by controlling a drive strength of the driver.

18. The processing system of claim 13, the logic further configured to generate the common-mode voltage at the electrical node with a buffer coupled by its output to the electrical node.

* * * * *